(12) United States Patent
Kim et al.

(10) Patent No.: US 11,585,981 B2
(45) Date of Patent: Feb. 21, 2023

(54) MULTI-MODE WAVEGUIDE SYSTEM AND CONNECTOR FOR PHOTONIC INTEGRATED CIRCUIT

(71) Applicant: Hirose Electric Co., Ltd., Kanagawa (JP)

(72) Inventors: Kihong Kim, San Jose, CA (US); Jeremy Buan, San Jose, CA (US); Tadashi Ohshida, Cupertino, CA (US); Tsutomu Matsuo, Tokyo (JP); Shuji Suzuki, Kanagawa (JP); Nobuhiro Tamai, Kanagawa (JP); Hiromichi Muraoka, Kanagawa (JP)

(73) Assignee: Hirose Electric Co., Ltd., Kanagawa (JP)

( * ) Notice: Subject to any disclaimer, the term of this patent is extended or adjusted under 35 U.S.C. 154(b) by 19 days.

(21) Appl. No.: 17/216,207

(22) Filed: Mar. 29, 2021

(65) Prior Publication Data
US 2021/0325608 A1    Oct. 21, 2021

Related U.S. Application Data

(60) Provisional application No. 63/089,346, filed on Oct. 8, 2020, provisional application No. 63/010,394, filed on Apr. 15, 2020.

(51) Int. Cl.
*G02B 6/122* (2006.01)
*G02B 6/14* (2006.01)
*G02B 6/12* (2006.01)

(52) U.S. Cl.
CPC .............. *G02B 6/1228* (2013.01); *G02B 6/14* (2013.01); *G02B 2006/1209* (2013.01); *G02B 2006/12114* (2013.01)

(58) Field of Classification Search
CPC ........ G02B 6/1228; G02B 2006/12114; G02B 6/14
See application file for complete search history.

(56) References Cited

U.S. PATENT DOCUMENTS

| | | | |
|---|---|---|---|
| 10,222,549 B2* | 3/2019 | Tu ............................. | G02B 6/12 |
| 2004/0057253 A1* | 3/2004 | DeCusatis .............. | G02B 6/425 |
| | | | 362/581 |
| 2005/0265653 A1* | 12/2005 | Cai ....................... | G02B 6/2552 |
| | | | 385/28 |
| 2014/0363120 A1* | 12/2014 | Stephens ................ | G02B 6/125 |
| | | | 385/14 |
| 2015/0050019 A1* | 2/2015 | Sengupta .............. | G02B 6/3845 |
| | | | 398/44 |
| 2017/0336565 A1* | 11/2017 | Ryckman ................ | G02B 1/115 |

FOREIGN PATENT DOCUMENTS

JP        H0710706 U   *  2/1995

\* cited by examiner

*Primary Examiner* — Charlie Y Peng
(74) *Attorney, Agent, or Firm* — Procopio, Cory, Hargreaves & Savitch LLP (57) ABSTRACT

Example implementations described herein are directed to a system involving one or more photonic integrated circuits having multi-mode waveguides and connected to a printed optical board through the use of multi-mode waveguide connectors described herein. The printed optical board can include an embedded multi-mode waveguide bus to facilitate optical signal to and from the photonic integrated circuits. The system can also include a chiplet such as a photonic integrated circuit with a single mode waveguide configured to connect to an optical fiber cable.

13 Claims, 7 Drawing Sheets

MULTI-MODE WAVEGUIDE SYSTEM AND CONNECTOR FOR PHOTONIC INTEGRATED CIRCUIT

CROSS REFERENCE TO RELATED APPLICATIONS

This patent application is based on and claims the benefit of domestic priority under 35 U.S.C 119(e) from provisional U.S. patent application No. 63/010,394, filed on Apr. 15, 2020, and U.S. Patent Application No. 63/089,346, filed on Oct. 8, 2020 the disclosures of which is hereby incorporated by reference herein in its entirety for all purposes.

BACKGROUND

Field

The present disclosure is generally directed to photonic integrated circuit (PIC) systems, and more specifically, to PIC systems with multi-mode waveguides and multi-mode waveguide connectors.

Related Art

In PIC systems, as the copper traces of the PIC systems collapse towards zero, the optical connectors become crowded in the immediate vicinity of the System on Chip (SoC). Unfortunately, there are no optical Input/Output (I/O) standards for this crowded-bus environment. The input and output of PIC (equivalent to the I/O buffer and the bonding pad of electrical systems), also known as off-chip optical bus, do not have any candidate solutions, industry consensus, or standard activities. The lack of such solutions is a near-term challenge facing connector makers that are involved with PIC components.

Figure 1:
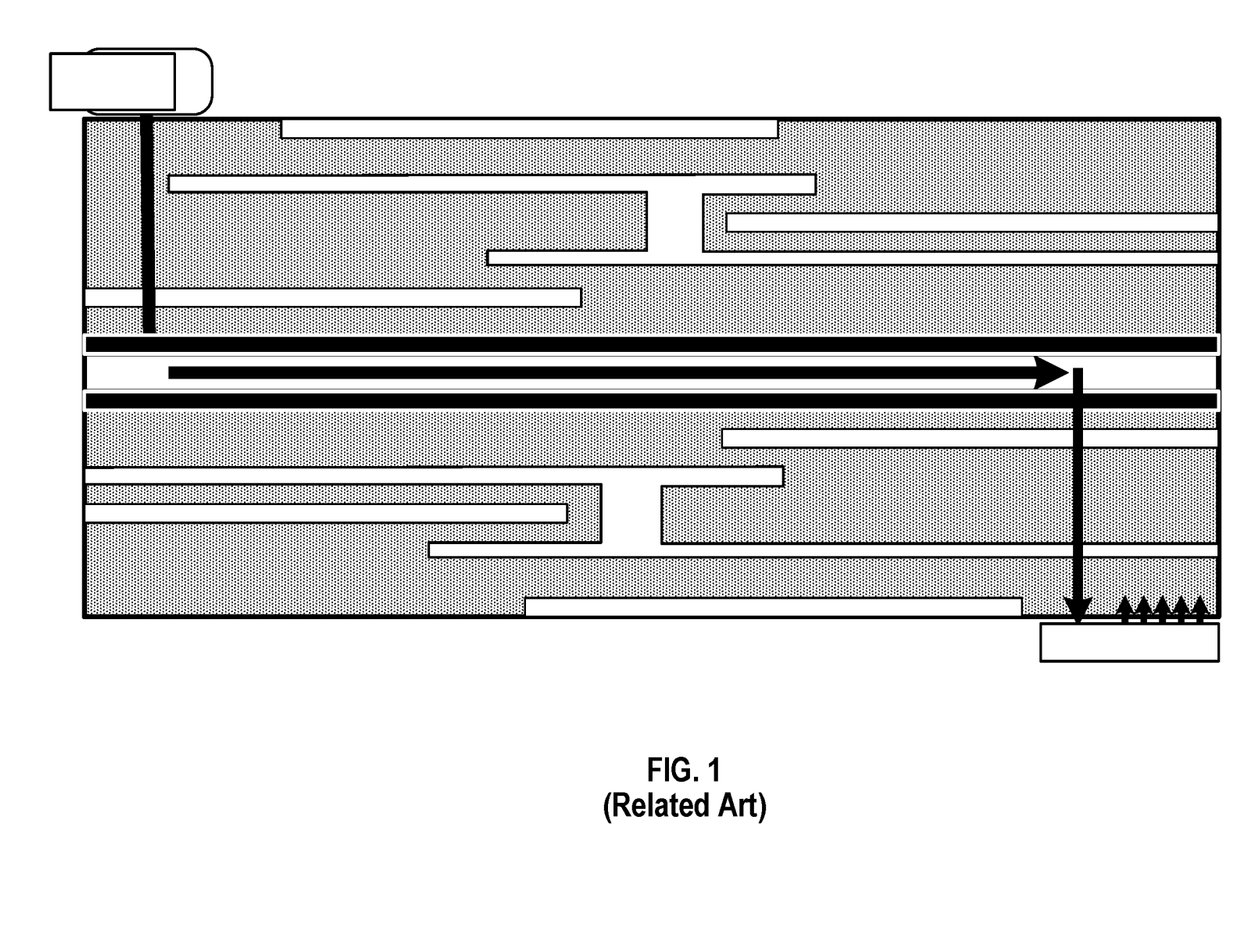
FIG. 1 illustrates an example Printed Optical Board (POB) system.

There have been recent developments in the design of a printed optical board (POB) to involve embedded waveguides within the circuit board. FIG. 1 illustrates an example POB system. Specifically, FIG. 1 illustrates an optical waveguide core layer which is embedded in a printed circuit board (PCB) material and process. The arrows indicate directions of light paths from the optical modules to the SoC. Since the optical layer and the electrical layer are aligned in manufacturing, assembly houses do not need to provide extra alignment. However, the material system requires a new lamination process, which increases the cost and yields unknown field product reliability.

SUMMARY

Example implementations described herein are directed to a system involving one or more photonic integrated circuits having multi-mode waveguides and connected to a printed optical board. The printed optical board can include an embedded multi-mode waveguide bus to facilitate optical signal to and from the photonic integrated circuits. The system can also include a chiplet such as a photonic integrated circuit with a single mode waveguide configured to connect to an optical fiber cable.

Example implementations described herein are directed to a multi-mode waveguide connector integrated into a system involving one or more photonic integrated circuits having multi-mode waveguides and connected to a printed optical board. The multi-mode waveguide connector can involve an adiabatic tapered portion to facilitate transitions from single mode optical signal to multi-mode optical signal, and a prism portion interfaced with a multi-mode waveguide and configured to direct multi-mode optical signal to and from the adiabatic tapered portion.

Aspects of the present disclosure involve a system having one or more multi-mode waveguide (MMW) photonic integrated circuits (PICs), each of the one or more MMW PICs involving a MMW connected over a bidirectional channel to an embedded digital equalizer configured to conduct electrical signal to optical signal conversion and optical signal to electrical signal conversion; a printed optical board (POB) including an embedded MMW bus connected with the MMW of the one or more MMW PICs; and a single mode waveguide (SMW) PIC connected to the MMW bus of the POB, the SMW PIC including a SMW connected over a bidirectional channel to an another embedded digital equalizer configured to conduct electrical signal to optical signal conversion and optical signal to electrical signal conversion.

Aspects of the present disclosure can further involve a multi-mode waveguide connector which can involve a prism portion configured to be engaged with a multi-mode waveguide; and an adiabatic tapered portion with a base portion interfaced with the prism portion and a top portion interfaced with a single mode waveguide, the base portion being wider than the top portion.

Aspects of the present disclosure can further involve a waveguide connector which can involve a prism portion configured to be engaged with a first waveguide; and an adiabatic tapered portion having a base portion interfaced with the prism portion and a top portion interfaced with a second waveguide, the base portion being wider than the top portion.

Aspects of the present disclosure can further involve a system having one or more photonic integrated circuits involving one or more multi-mode waveguides; and one or more multi-mode waveguide connectors connected to the one or more multi-mode waveguides, each of the one or more multi-mode waveguide connectors involving a prism portion configured to be engaged with the one or more multi-mode waveguides; and an adiabatic tapered portion comprising a base portion interfaced with the prism portion and a top portion interfaced with a single mode waveguide, the base portion being wider than the top portion.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. Example implementations described herein may be used singularly, or in combination other example implementations described herein, or with any other desired implementation.

In PIC systems involving POBs with embedded waveguides, optical connectors are needed to facilitate the interfaces between board to optical module, and board to chip. Because the copper trace length will eventually become zero, the optical to electrical system and interfaces will be such that the chiplet will eventually be disposed right on the packaging.

Example implementations described herein are therefore directed to a system involving multi-mode waveguides as integrated with a POB.

Figure 2:
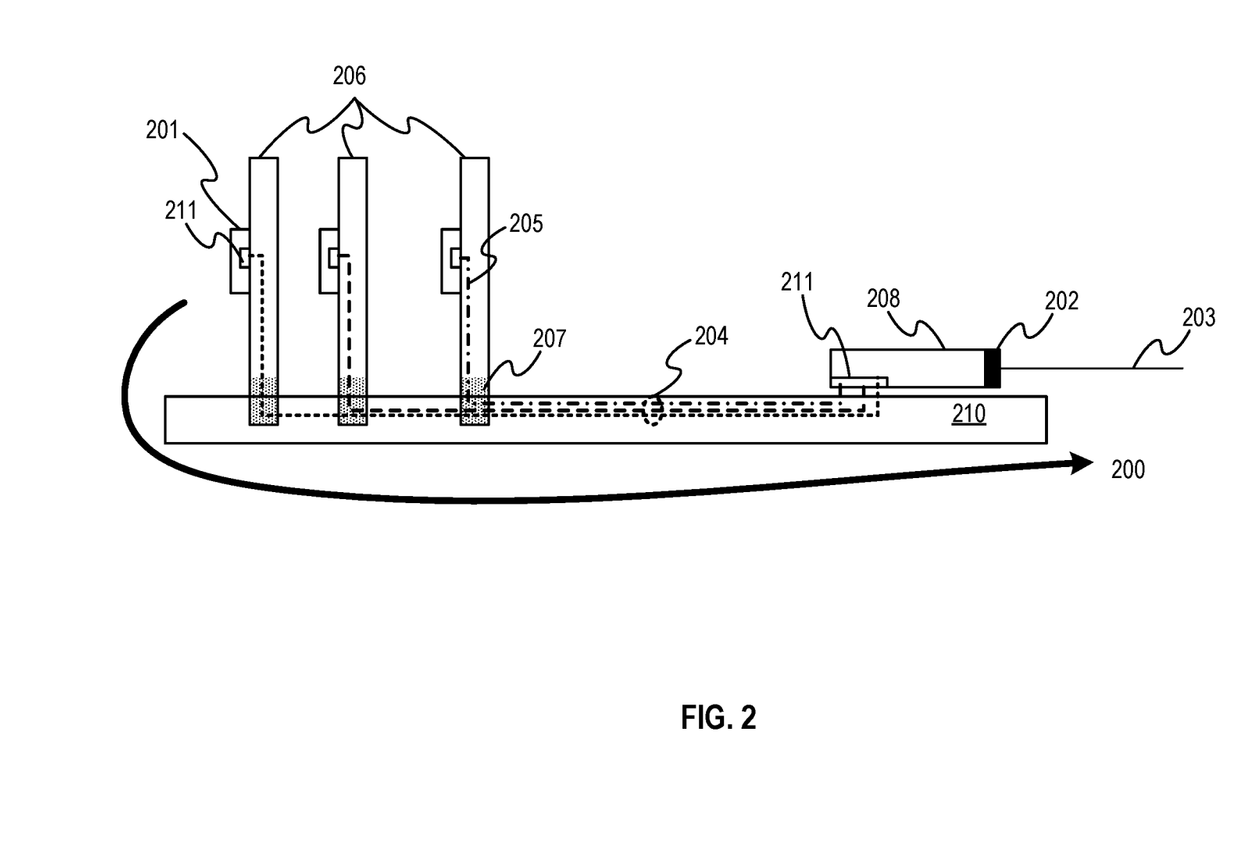
FIG. 2 illustrates an example system involving multi-mode waveguides for a PIC, in accordance with an example implementation.

FIG. 2 illustrates an example system, in accordance with an example implementation. In the example implementation illustrated in FIG. 2, there are one or more multi-mode waveguide (MMW) PICs 206 that are connected to a POB 210 to interface with a chiplet 208 connected to an ultra-optical fiber cable 203 through a waveguide to fiber cable connector 202. Each of the one or more MMW PICs 206 include an MMW 205 configured to facilitate optical signal from the MMW PIC to the POB, and are connected, via a bidirectional channel, to an embedded digital equalizer 201 configured to conduct electrical signal/optical signal conversion. In the system as described herein, MMW PICs 206 and PIC 208 can be configured to conduct aggregation, optical switching (e.g., switching function) and electrical function depending on the desired implementation. Such implementations can avoid single mode approaches of the related art.

Figure 3:
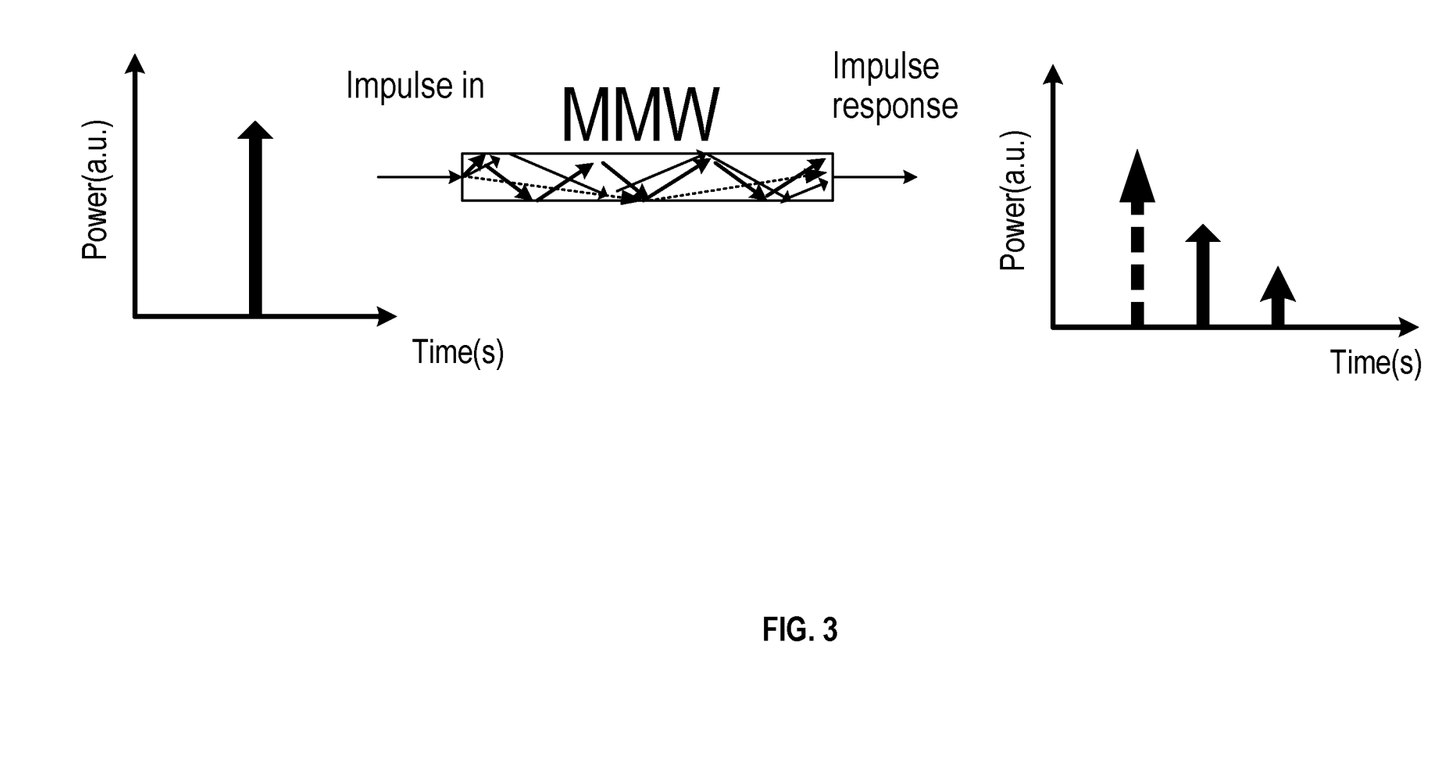
FIG. 3 illustrates example impairment from a multi-mode waveguide implementation for a PIC.

Embedded digital equalizer 201 is configured to conduct electrical signal to optical signal conversion for egress signals from the MMW PICs 206 through the MMW 205, or optical signal to electrical signal conversion for ingress signals from the MMW 205 to the MMW PICs 206. In an example implementation, the embedded digital equalizer 201 can involve a Serializer/Deserializer (SERDES) linear or non-linear equalizer scheme to compensate the impairments that MMW 205 will generate. The impairment induced by the MMW 205 (either from the multi-mode waveguide or fiber) is in the form of modal dispersion as illustrated in FIG. 3. This is deterministic noise like reflection and insertion which can be compensated by an embedded digital equalizer 201, whether it be a linear equalizer or non-linear equalizer. Embedded digital equalizer 201 interfaces between the MMW PICs 206 and the MMW 205 through a chip to waveguide connector 211. As described herein, the embedded digital equalizer 201 is utilized for channel signal impairments over optical paths.

MMW Bus 204 involves waveguides embedded in the POB 210 that are connected to the PICs 206 via waveguide to waveguide connector 207 to aggregate the optical signals going through the POB 210. The waveguide to waveguide connector 207 is an optical signal to optical signal interface which directs the optical signal through MMW Bus 204 along the signal flow direction 200 for an egress signal, or from the MMW Bus 204 through MMW PICs 206 for an ingress signal.

PIC 208 can involve both an MMW PIC and a single mode waveguide (SMW) PIC and is configured to connect to ultra-optical fiber cable 203 through a waveguide to fiber cable connector 202. PIC 208 also connects to POB 210 with a chip to waveguide connector 211 to interface the PIC 208 with the MMW Bus 204. Similarly, PIC 208 can also involve an equalizer to facilitate optical signal to electrical signal for an egress signal 200 from the MMW PICs 206 to the PIC 208, or electrical signal to optical signal to the MMW Bus 204 for an ingress signal. PIC 208 is configured to convert the optical signals received from the MMW Bus 204 through the chip to waveguide connector 211 into an electrical signal, which can then be converted to an optical signal for output to an ultra-optical fiber cable 203, such as a single mode fiber (SMF) cable.

In the example of FIG. 2, the PICs 206 can be in the form of transport PICs (tPIC) and PIC 208 can be in the form of a Switch PIC (swPIC). In example implementations described herein, the tPICs are configured to have multi-mode wave guide interfaces facilitated by waveguide connector 211, whereas the Switch PIC has both the multi-mode wave guide interface as well as the SMF interface for the cable 203.

Figure 4:
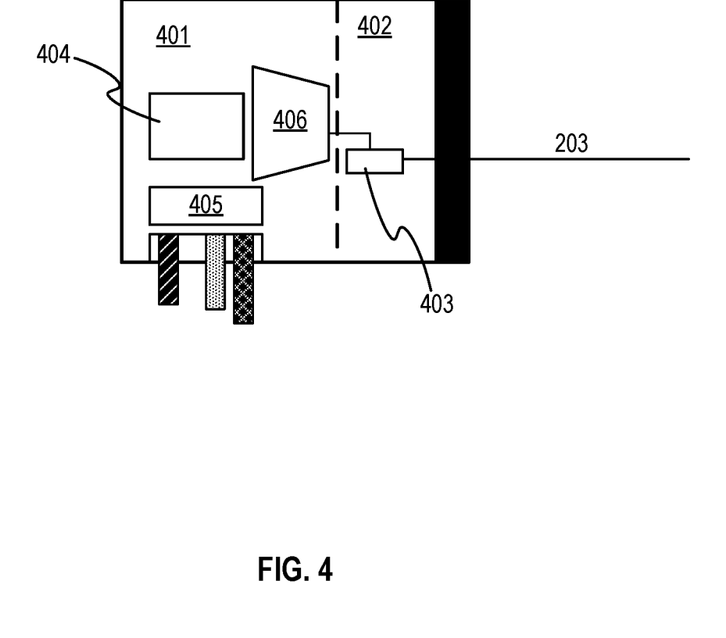
FIG. 4 illustrates an example of a PIC in the system, in accordance with an example implementation.

FIG. 4 illustrates an example diagram of PIC 208, in accordance with an example implementation. PIC 208 is a hybrid mode waveguide (HMW) PIC which has two portions, the MMW PIC 401 and the SMW PIC 402. MMW PIC 401 and SMW PIC 402 are bonded with optical-to-electrical and electrical-to-optical conversion in one package, connected to the MMW bus 204 of the POB 210 at the port side of the MMW PIC 401 and also connected to an SMW bus of either a POB 210 or SMF 203 (e.g., by direct fly over from POB plane) at the port side of the SMW PIC 402. Depending on the desired implementation, MMW PIC 401 can also be separated as a self-packaged part (e.g., external to the HMW PIC), or can be integrated in the HMW PIC as a sub-module or packaging. Each of these portions is equipped with its own type of embedded digital equalizer that is subtended to each physical media. The embedded digital equalizer 404 embedded in the MMW PIC 401 is for MMW channel compensation and compensates for the MMW in the POB, whereas embedded digital equalizer 403 embedded in the SMW PIC 402 is for SMF channel compensation and compensates for the SMF 203 and SMW connected to multiplexer/demultiplexer 406.

The MMW PIC 401 is configured to facilitate the connection between the HMW PIC and the MMW bus 204 in the POB 210. Similarly, the SMW PIC 402 is configured to facilitate out of plane connectivity between the HMW PIC and the SMF 203. Depending on the desired implementation, the SMW PIC 402 can also connect to a SMW bus in the POB 210. The SMW PIC 402 can also include a SMW connected over a bidirectional channel to an embedded digital equalizer configured to conduct electrical signal to optical signal conversion and optical signal to electrical signal conversion.

HMW PIC is configured to convert aggregated optical signals from the embedded MMW bus 204 to an electrical signal through another embedded digital equalizer, and convert the electrical signal to an optical signal to output to a SMW fiber cable 203. Such conversions can be implemented through integrated functions such as traffic grooming for switching and/or multiplexing and demultiplexing in the middle of electrical processing stage, depending on the desired implementation.

Depending on the desired physical layout, the MMW PIC portion 401 may or may not have an MMW inside the portion, and SMW PIC portion 402 may or not have a SMW inside itself. Each equalizer compensates for the external MMW/SMF or internal MMW/SMW depending on the desired implementation. SMF is a subset of SMW in these example implementations.

MMW PIC portion 401 may have further functions in optical domain such as OSW (optical switch) 405 configured in MM domain. Similarly, SMW PIC portion 402 may have further functions in optical domain such as OSW (optical switch) in SM domain.

OSW functions may be defined in any orthogonal physical media such as a multi-lambda carrier, frequency subcarrier, time domain multiple access, frequency domain multiple access, and so on.

Described herein are example implementations of waveguide connector 211 that can be utilized to interface the PIC with the MMW Bus.

Figure 5:
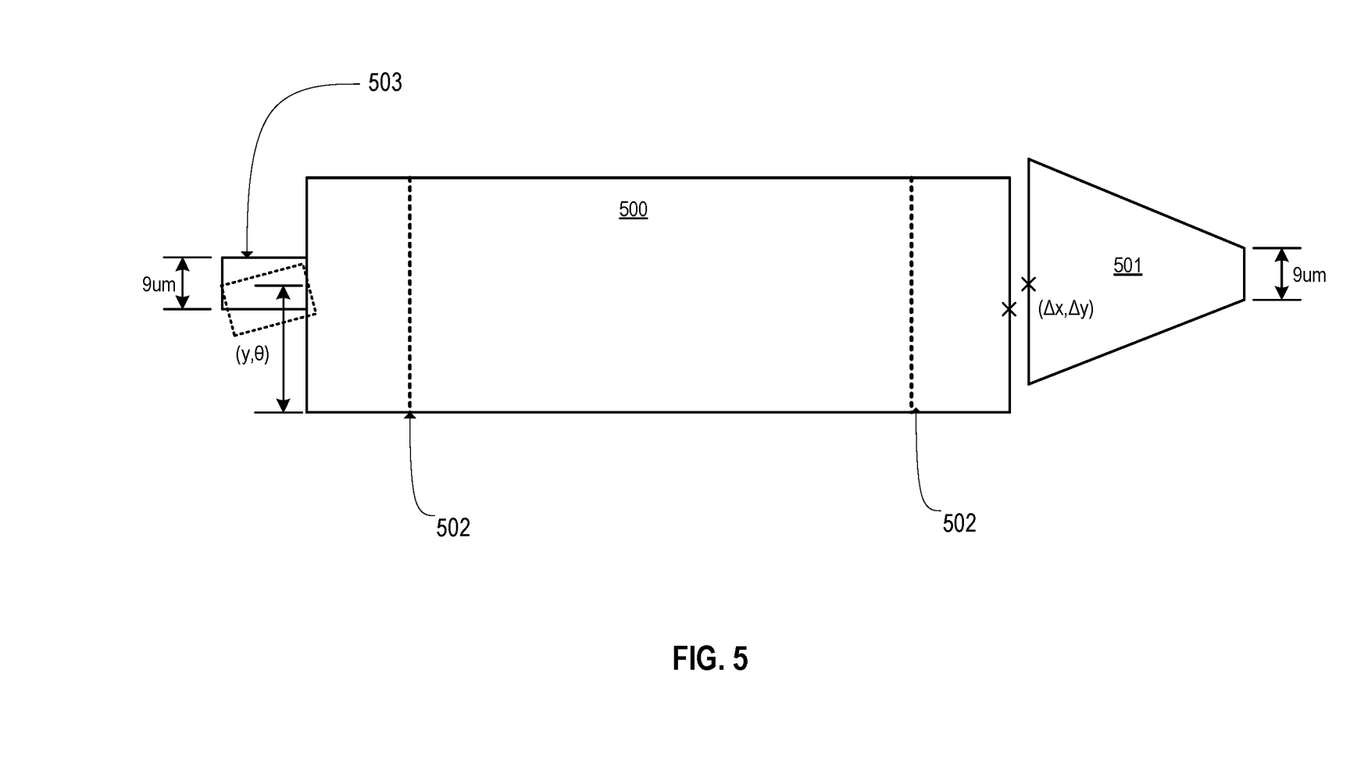
FIG. 5 illustrates an example cross section of a waveguide connector with an adiabatic tapered portion, in accordance with an example implementation.

FIG. 5 illustrates an example cross section of a waveguide connector with an adiabatic tapered portion, in accordance with an example implementation. In the example of the waveguide connector 211 described herein, there is a prism portion 500 that is configured to handle multi-mode optical signal transmission and another portion 501 having adiabatic tapered (small area to large area for transition of optical mode) from the base portion (large area) to the top portion (small area), which facilitates single mode optical signal transmission. The prism portion may incorporate one or more mirrors 502 to facilitate the prism functionality. The adiabatic tapered portion 501 can facilitate as an interface to convert multi-mode optical signal to single mode optical signal, and vice versa. As will be described herein, the waveguide connector can also include a body portion which can be adjusted from a length of 10 to 100 cm depending on the desired implementation.

The adiabatic tapered portion 501 proceeds from narrow to wide from the single mode waveguide to the prism portion to facilitate the transition from the single mode to multi-mode. In an example implementation, the top of the adiabatic tapered portion can involve a square shaped portion that interfaces with the single mode waveguide, and is generally small in area (e.g., 9 µm by 9 µm) which can also match the width dimensions of the interface of the waveguide connector to the mode source 503. The prism portion 500 is configured to interface with the mode source 503 such as the MMW 205 of the MMW bus 204 of the POB 210.

Figure 6:
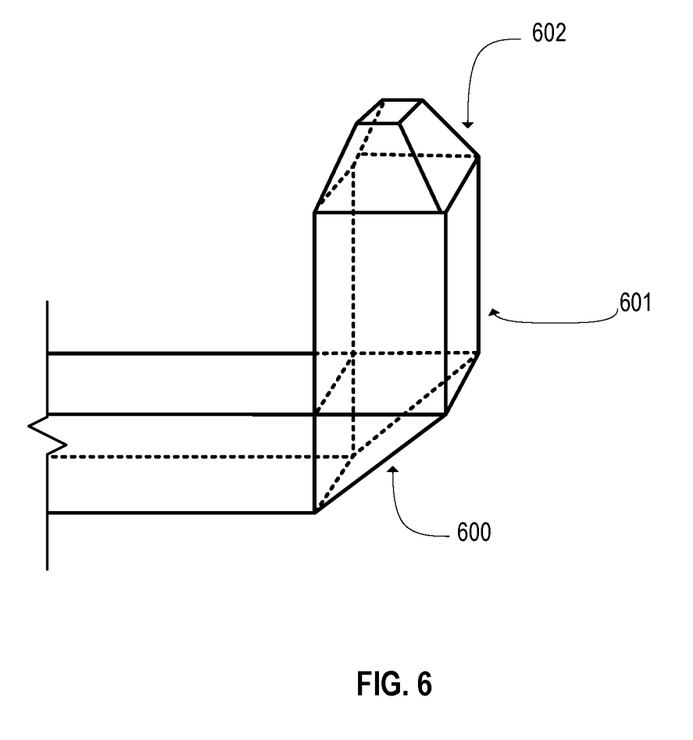
FIG. 6 illustrates an example configuration of a waveguide connector, in accordance with an example implementation.

FIG. 6 illustrates an example configuration of a waveguide connector, in accordance with an example implementation. Specifically, FIG. 6 illustrates a waveguide connector interfacing having a prism section 600 that interfaces with an MMW 205, a body section 601 that carries optical signal between the adiabatic tapered portion and the prism section, and an adiabatic tapered portion 602 configured to convert multi-mode optical signal to single mode and vice versa.

The prism portion 600 is configured to interface with the MMW 205 orthogonally from the adiabatic tapered portion 602 and the body portion 601. To interface with the MMW 205, the dimensions of the interface of the prism portion 600 can be in the form of a 50 um by 50 um square shape, or other shapes in accordance with the desired implementation. The prism portion can have a length between 10 mm and 500 mm so as to be configured to direct multi-mode optical signal from the MMW 205 towards the wide portion of the adiabatic tapered portion 602 via the body portion 601, and also to direct multi-mode optical signal from the wide portion of the adiabatic tapered portion 602 through the MMW 205 via the body portion 601 and through orthogonal redirection of the multi-mode optical signal via the prism portion 600.

The body portion 601 in the example of FIG. 6 is configured to facilitate transmission of multi-mode optical signal between the prism portion 600 and the adiabatic tapered portion 601. As illustrated in FIG. 6, the body portion 601 interfaces the base portion of the adiabatic tapered portion 602 with the prism portion 601, and is configured to direct multi-mode optical signal to the prism portion 600 or to the base portion of the adiabatic tapered portion 602. Depending on the desired implementation, the body portion can also be omitted so the multi-mode optical signal is directly transmitted between the prism portion 600 and the adiabatic tapered portion 602. In such a configuration, the base portion of the adiabatic tapered portion 602 interfaces directly to the prism portion 600 as opposed to interfacing with the prism portion 600 via the body portion 601.

As illustrated in FIG. 6, the body portion 601 is rectangular shaped (e.g., in the form of a rectangular parallelepiped) to facilitate the transfer of the multi-mode optical signal from the prism portion to the adiabatic tapered portion along the length of the rectangular shape.

The adiabatic tapered portion 602 is configured in the form of a pyramid with the wide portion towards the base portion, and the narrow portion towards the top portion so as to be narrower than the base portion. However, other shapes having an adiabatic taper can also be utilized and the present disclosure is not limited thereto. In the example, the top portion of the adiabatic tapered portion 602 is in the form of a square (e.g., 9 µm by 9 µm) that is configured to receive single mode optical signal and engage with a single mode waveguide, a SMW PIC, or a single mode optical cable, wherein the adiabatic tapered portion 602 transitions the single mode optical signal to multi-mode optical signal through the narrow to wide-structure of the pyramid. Further, the multi-mode optical signal can also be transitioned to single mode optical signal through the wide portion to narrow portion structure of the pyramid.

Figure 7:
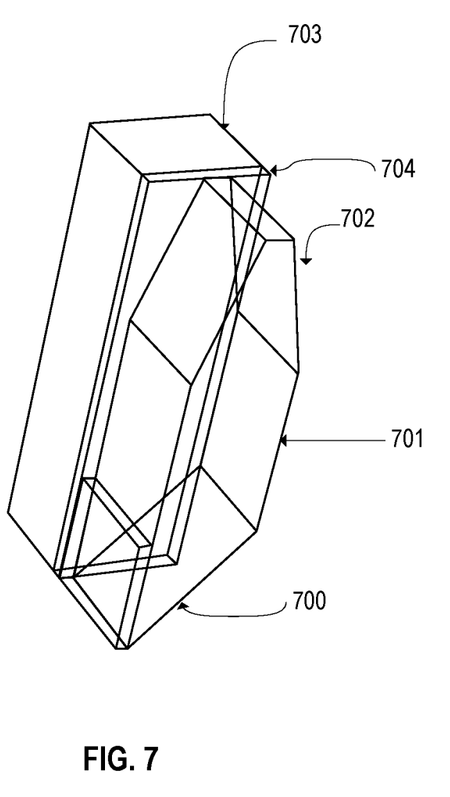
FIG. 7 illustrates another example configuration of the waveguide connector, in accordance with an example implementation.

FIG. 7 illustrates another example configuration of the waveguide connector 211, in accordance with an example implementation. In the example configuration of FIG. 7, the connector retains the same structure as FIG. 6 to involve a prism portion 700, a body portion 701, and an adiabatic tapered portion 702 to facilitate the same functionality. In this example configuration, the connector is disposed on a substrate 703 with adhesive and cladding material 704, and the adiabatic tapered portion 702 is in the form of a triangle with a narrow rectangular portion as the top portion. The substrate 703 is used to support the waveguide connector 211 and can be made of any material in accordance with the desired implementation. Through the example implementation of FIG. 7, the waveguide position can thereby be more easily adjusted and affixed to peripheral parts through the attachment to the substrate 703.

In an example, the waveguide connector 211 is inserted through a via to interface with the chiplet 208. The chiplet 208 converts electrical signal to single mode optical signal and directs the single optical mode signal into the top portion of the adiabatic tapered portion (e.g., through the narrow rectangular top in the example of FIG. 7).

In an example, the waveguide connector 211 is made of a polymer and is clad-coated with a coating having a reflective index that is lower than the single mode waveguide or the multi-mode waveguide. In such an example, the interfacing portions of the prism portion and the top portion of the adiabatic tapered portion are not coated, but have a reflective index that is similar to that of the corresponding interfacing waveguides.

In addition, metal coatings may be added on one end of the prism structure to facilitate the orthogonal redirection of the multi-mode optical signal. The metal coating is incorporated on the angular (e.g., 45 degree) surface of the prism portion. The metal coating is roughly less than or equal to one micrometer of thickness to facilitate the reflection required for the prism portion and to keep costs down. An example of the metal coating can be gold; however, other coatings can be used in accordance with the desired implementation.

Through the example implementations described herein, embedded digital equalizers utilized in MMW waveguides (electrical/optical) outfitted with linear filters having linear attenuation can thereby facilitate 100 Gigabit or higher output. Such example implementations can be suitable for data centers which transmit signal through the single mode fiber cable.

Although this system is described with respect to a waveguide connector interfacing between the single mode interface of the PIC and MMW waveguides, the example implementations described herein are not limited thereto, and can be modified in accordance with the desired implementation. For example, either the transmitting PIC or receiving PIC could have a multi-mode optical interface for an MMW waveguide instead of a single mode interface, whereupon the multi-mode optical interface of the PIC can be configured to interact with the connector. Further, depending on the desired implementation, the MMW bus 204 can be replaced by a single mode waveguide bus instead, such that the connector facilitates optical signals between a single mode interface of a PIC or a multi-mode interface of a PIC to the single mode waveguide of the single mode waveguide bus. Accordingly, the example implementations described herein can be extended to other waveguide combinations for the waveguide connector and the present disclosure is not limited thereto. For example, the prism portion 601 can be configured to be interfaced with a single mode waveguide, in which case the optical signal of the single mode waveguide is simply rerouted orthogonally towards the adiabatic tapered portion 602. Similarly, the adiabatic tapered portion 602 can be configured to engage with a multi-mode waveguide from which the optical signal of the multi-mode waveguide is converted to a single mode signal via an equalizer and then reconverted to a multi-mode signal through the adiabatic tapered portion 602.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A multi-mode waveguide connector, comprising:
a prism portion configured to be engaged with a multi-mode waveguide of a printed optical board (POB); and
an adiabatic tapered portion comprising:
a base portion interfaced with the prism portion; and
a top portion interfaced with a single mode waveguide of a photonic integrated circuit (PIC), the base portion being wider than the top portion,
wherein the adiabatic tapered portion has a pyramid shape.

2. The multi-mode waveguide connector of claim 1, further comprising a body portion that interfaces the base portion of the adiabatic tapered portion with the prism portion, the body portion configured to direct multi-mode optical signal to the prism portion or to the base portion of the adiabatic tapered portion.

3. The multi-mode waveguide connector of claim 2, wherein the body portion is a rectangular shape.

4. The multi-mode waveguide connector of claim 1, wherein the prism portion is configured to be engaged with the multi-mode waveguide orthogonally to the adiabatic tapered portion.

5. The multi-mode waveguide connector of claim 1, wherein the top portion of the adiabatic tapered portion comprises a rectangular portion.

6. A system comprising:
one or more photonic integrated circuits comprising one or more multi-mode waveguides; and
one or more multi-mode waveguide connectors connected to the one or more multi-mode waveguides, each of the one or more multi-mode waveguide connectors comprising:
a prism portion configured to be engaged with the one or more multi-mode waveguides; and
an adiabatic tapered portion comprising:
a base portion interfaced with the prism portion; and
a top portion interfaced with a single mode waveguide, the base portion being wider than the top portion,
wherein the one or more multi-mode waveguides are connected over a bidirectional channel to an embedded digital equalizer configured to conduct electrical signal to optical signal conversion and optical signal to electrical signal conversion, and
wherein the system further comprises a printed optical board comprising an embedded multi-mode waveguide bus connected with the one or more multi-mode waveguides.

7. The system of claim 6, further comprising a hybrid mode waveguide photonic integrated circuit, the hybrid mode waveguide photonic integrated circuit comprising a multi-mode waveguide photonic integrated circuit and a single mode waveguide photonic integrated circuit bonded together through Optical-to-electrical and Electrical-to-optical conversion in one package, the hybrid mode waveguide photonic integrated circuit connected to the multi-mode waveguide bus of the printed optical board from the multi-mode waveguide photonic integrated circuit, and connected to one of a single mode waveguide bus of the printed optical board or a single mode fiber cable from the single mode waveguide photonic integrated circuit,
wherein the single mode waveguide photonic integrated circuit comprises a single mode waveguide connected over a bidirectional channel to another embedded digital equalizer configured to conduct electrical signal to optical signal conversion and optical signal to electrical signal conversion.

8. The system of claim 7, wherein the hybrid mode waveguide photonic integrated circuit is configured to convert aggregated optical signals from the embedded multi-mode waveguide bus to an electrical signal through the another embedded digital equalizer, and convert the electrical signal to an optical signal to output to the one of the single mode waveguide bus of the printed optical board or the single mode fiber cable from the single mode waveguide photonic integrated circuit.

9. A waveguide connector comprising:
a prism portion configured to be engaged with a first waveguide of a printed optical board (POB); and
an adiabatic tapered portion comprising a base portion interfaced with the prism portion and a top portion interfaced with a second waveguide of a photonic integrated circuit (PIC), the base portion being wider than the top portion, wherein the adiabatic tapered portion has a pyramid shape.

10. The waveguide connector of claim 9, wherein the first waveguide and the second waveguide are multi-mode waveguides.

11. The waveguide connector of claim 9, wherein the first waveguide is a single mode waveguide, and the second waveguide is a multi-mode waveguide.

12. The waveguide connector of claim 9, wherein the first waveguide and the second waveguide are single mode waveguides.

13. The waveguide connector of claim 9, wherein the first waveguide is a multi-mode waveguide, and the second waveguide is a single mode waveguide.

* * * * *